(12) United States Patent
Dicke et al.

(10) Patent No.: US 10,932,091 B2
(45) Date of Patent: *Feb. 23, 2021

(54) METHOD AND APPARATUS FOR LOCATION NOTIFICATION USING LOCATION CONTEXT INFORMATION

(71) Applicant: BlackBerry Limited, Waterloo (CA)

(72) Inventors: Ronald Anthony Dicke, Ottawa (CA); Gaëlle Christine Martin-Cocher, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,812

(22) Filed: Jun. 24, 2019

(65) Prior Publication Data

US 2019/0313207 A1 Oct. 10, 2019

Related U.S. Application Data

(63) Continuation of application No. 15/707,363, filed on Sep. 18, 2017, now Pat. No. 10,334,400, which is a
(Continued)

(51) Int. Cl.
*H04W 24/00* (2009.01)
*H04W 4/02* (2018.01)
(Continued)

(52) U.S. Cl.
CPC ............. *H04W 4/025* (2013.01); *H04W 4/02* (2013.01); *H04W 4/029* (2018.02); *H04W 64/00* (2013.01);
(Continued)

(58) Field of Classification Search
CPC .......... G01C 21/3492; G08G 1/096827; H04L 67/18; H04L 51/32; H04L 67/22;
(Continued)

(56) References Cited

U.S. PATENT DOCUMENTS 6,311,069 B1 10/2001 Havinis et al.
6,411,891 B1 6/2002 Jones
(Continued)

FOREIGN PATENT DOCUMENTS

CN 1237315 A 12/1999
EP 1473959 A1 11/2004
(Continued)

OTHER PUBLICATIONS

U.S. Appl. No. 14/711,512, Notice of Allowance dated May 24, 2017.
(Continued)

*Primary Examiner* — Danh C Le
(74) *Attorney, Agent, or Firm* — Borden Ladner Gervais LLP; Todd Keeler

(57) ABSTRACT

Provided is a method and apparatus for location notification using location context information. In accordance with an embodiment of the disclosure, a mobile device automatically generates location context information that indicates a point of interest in a vicinity of the mobile device. For example, if the user of the mobile device is at home, then the location context information indicates that the user is at home instead of merely indicating latitude/longitude information corresponding to the location of the home. The mobile device displays the location context information in order to convey the location of the mobile device in a manner that is meaningful without the need for a map. Alternatively, or additionally, the mobile device provides the location context information to at least one other device. This serves to inform other users of the location of the mobile device in a manner that is meaningful without the need for a map.

22 Claims, 6 Drawing Sheets

US 10,932,091 B2

Page 2

Related U.S. Application Data continuation of application No. 14/711,512, filed on May 13, 2015, now Pat. No. 9,775,000, which is a continuation of application No. 12/432,412, filed on Apr. 29, 2009, now Pat. No. 9,049,543.

(51) Int. Cl.

| | | |
|---|---|---|
| *H04W 64/00* | (2009.01) | |
| *H04W 4/029* | (2018.01) | |
| *H04M 1/725* | (2021.01) | |
| *H04W 88/02* | (2009.01) | |
| *H04L 29/08* | (2006.01) | |

(52) U.S. Cl.
CPC ...... *H04L 29/08072* (2013.01); *H04L 69/329* (2013.01); *H04M 1/72519* (2013.01); *H04M 1/72522* (2013.01); *H04W 88/02* (2013.01)

(58) Field of Classification Search
CPC ........... H04L 29/08657; H04W 4/028; H04W 4/023; H04W 64/00; H04W 4/02; H04W 88/02; H04M 1/72519; H04M 1/72522
USPC ............ 455/456.3, 456.1, 456.6, 550.1, 418; 701/526
See application file for complete search history.

(56) References Cited

U.S. PATENT DOCUMENTS

| | | | |
|---|---|---|---|
| 6,438,370 B1 | 8/2002 | Einola et al. | |
| 6,529,143 B2 | 3/2003 | Mikkola et al. | |
| 6,587,782 B1 | 7/2003 | Nocek et al. | |
| 6,885,874 B2 | 4/2005 | Grube et al. | |
| 7,164,986 B2 | 1/2007 | Humphries et al. | |
| 7,224,987 B1 | 5/2007 | Bhela et al. | |
| 7,305,365 B1 | 12/2007 | Bhela et al. | |
| 7,339,469 B2 | 3/2008 | Braun et al. | |
| 7,395,075 B2 | 7/2008 | Posner et al. | |
| 7,826,830 B1 | 11/2010 | Patel et al. | |
| 8,000,724 B1 | 8/2011 | Rayburn et al. | |
| 8,019,532 B2 | 9/2011 | Sheha et al. | |
| 8,200,204 B2 | 6/2012 | Cho et al. | |
| 8,239,130 B1 | 8/2012 | Upstill et al. | |
| 8,589,069 B1 | 11/2013 | Lehman | |
| 9,049,543 B2 | 6/2015 | Dicke et al. | |
| 9,602,193 B1* | 3/2017 | Mendelson | G08G 1/14 |
| 9,775,000 B2 | 9/2017 | Dicke et al. | |
| 9,961,507 B1* | 5/2018 | Mendelson | H04W 4/90 |
| 10,334,400 B2 | 6/2019 | Dicke et al. | |
| 2002/0145561 A1 | 10/2002 | Sandhu et al. | |
| 2003/0036848 A1* | 2/2003 | Sheha | G01C 21/3679 701/468 |
| 2003/0069690 A1 | 4/2003 | Correia et al. | |
| 2003/0078042 A1 | 4/2003 | Miriyala et al. | |
| 2003/0220835 A1* | 11/2003 | Barnes, Jr. | G06Q 10/1053 705/14.36 |
| 2004/0039814 A1 | 2/2004 | Crabtree et al. | |
| 2005/0046584 A1* | 3/2005 | Breed | B60C 11/24 340/13.31 |
| 2005/0132016 A1 | 6/2005 | Boone et al. | |
| 2005/0185615 A1 | 8/2005 | Zegelin | |
| 2005/0255861 A1* | 11/2005 | Wilson | H04W 64/00 455/456.2 |
| 2006/0182587 A1* | 8/2006 | Hrkal | B65G 7/12 414/626 |
| 2006/0187028 A1 | 8/2006 | Kiang et al. | |
| 2006/0270421 A1 | 11/2006 | Phillips et al. | |
| 2007/0015520 A1 | 1/2007 | Casey | |
| 2007/0018811 A1 | 1/2007 | Gollu et al. | |
| 2007/0024440 A1 | 2/2007 | Moran et al. | |
| 2007/0048484 A1 | 3/2007 | Weiss et al. | |
| 2007/0218891 A1* | 9/2007 | Cox | G01C 21/20 455/422.1 |
| 2007/0224977 A1 | 9/2007 | Yamaguchi et al. | |
| 2007/0244631 A1 | 10/2007 | Jung et al. | |
| 2007/0244633 A1 | 10/2007 | Phillips et al. | |
| 2007/0249364 A1 | 10/2007 | Bells et al. | |
| 2007/0282621 A1* | 12/2007 | Altman | G06Q 10/10 705/319 |
| 2008/0039120 A1* | 2/2008 | Gad | G01C 21/20 455/456.2 |
| 2008/0070593 A1 | 3/2008 | Altman et al. | |
| 2008/0071770 A1 | 3/2008 | Schloter et al. | |
| 2008/0153487 A1 | 6/2008 | Martin et al. | |
| 2008/0165018 A1* | 7/2008 | Breed | G08G 1/161 340/573.1 |
| 2008/0186165 A1 | 8/2008 | Bertagna et al. | |
| 2008/0201310 A1 | 8/2008 | Fitzpatrick et al. | |
| 2008/0234888 A1 | 9/2008 | Zanardelli et al. | |
| 2008/0267504 A1 | 10/2008 | Schloter et al. | |
| 2008/0274752 A1* | 11/2008 | Houri | G01S 5/0252 455/456.1 |
| 2008/0309485 A1 | 12/2008 | Raduchel et al. | |
| 2009/0011772 A1 | 1/2009 | Choi et al. | |
| 2009/0043501 A1 | 2/2009 | Lohi et al. | |
| 2009/0043506 A1* | 2/2009 | Breed | G08G 1/161 701/472 |
| 2009/0098882 A1* | 4/2009 | Yoon | H04M 1/72572 455/456.1 |
| 2009/0102668 A1 | 4/2009 | Thompson et al. | |
| 2009/0111487 A1 | 4/2009 | Scheibe | |
| 2009/0138439 A1* | 5/2009 | Yeung | G06F 16/9537 |
| 2009/0140887 A1* | 6/2009 | Breed | G01C 21/165 340/990 |
| 2009/0163183 A1* | 6/2009 | O'Donoghue | G06Q 30/02 455/414.1 |
| 2009/0176509 A1 | 7/2009 | Davis et al. | |
| 2009/0228208 A1 | 9/2009 | Yang et al. | |
| 2009/0235176 A1* | 9/2009 | Jayanthi | H04L 12/189 715/738 |
| 2009/0267867 A1* | 10/2009 | Gonia | G06F 3/1454 345/1.1 |
| 2009/0319181 A1* | 12/2009 | Khosravy | G01C 21/20 701/532 |
| 2010/0076968 A1* | 3/2010 | Boyns | H04W 4/21 707/732 |
| 2010/0131642 A1 | 5/2010 | Chalikouras et al. | |
| 2010/0134484 A1 | 6/2010 | Chen et al. | |
| 2010/0198917 A1* | 8/2010 | Petersen | H04W 4/029 709/204 |
| 2010/0228612 A1* | 9/2010 | Khosravy | G06Q 30/0601 705/14.4 |
| 2010/0259611 A1 | 10/2010 | Keshavarzian et al. | |
| 2010/0273509 A1 | 10/2010 | Sweeney et al. | |
| 2010/0280751 A1* | 11/2010 | Breed | G08G 1/161 701/414 |
| 2011/0145718 A1* | 6/2011 | Ketola | G06F 3/0346 715/739 |
| 2011/0161875 A1* | 6/2011 | Kankainen | G06F 3/14 715/810 |
| 2012/0019365 A1 | 1/2012 | Tuikka et al. | |
| 2012/0077475 A1 | 3/2012 | Holcomb et al. | |
| 2013/0165164 A1 | 6/2013 | Rowe | |

FOREIGN PATENT DOCUMENTS

| | | |
|---|---|---|
| EP | 1480011 A1 | 11/2004 |
| EP | 1528714 A1 | 5/2005 |
| EP | 1840514 A1 | 10/2007 |
| EP | 1850606 A1 | 10/2007 |
| WO | 9821913 A2 | 5/1998 |
| WO | 0221478 A2 | 3/2002 |
| WO | 03034765 A1 | 4/2003 |
| WO | 03053077 A1 | 6/2003 |

(56) References Cited

FOREIGN PATENT DOCUMENTS

| WO | 2006118373 A1 | 11/2006 |
| WO | 2007002303 A1 | 1/2007 |

OTHER PUBLICATIONS

U.S. Appl. No. 14/711,512, Office Action dated Jan. 26, 2017.
U.S. Appl. No. 15/707,363, Notice of Allowance dated Feb. 13, 2019.
U.S. Appl. No. 15/707,363, Notice of Allowance dated May 1, 2019.
Wavemarket, Inc., "Wavemarket," Nov. 11, 2006, 2 pages [online] [retrieved on Feb. 1, 2009]. Retrieved from the Internet:[URL: http://www.wavemarkel.com/products_page.php?product=1].
Witteman., "Efficient Proximity Detection Among Mobile Clients Using the GSM Network," Thesis, Master of Embedded Systems, Department of Computer Science Design and Analysis of Communication Systems, University of Twente, Enschede, Netherlands, Oct. 2007, 83 pages.
Azis., "Blackberry Tracker: Free Live GPS Tracking & Anti-Theft with Geofence Alerts & GPS History for Blackberry," February 2008, 4 pages [online] [retrieved on Feb. 1, 2009]. Retrieved from the Internet:[URL:http://thinkabdul.com/2008/02/02/blackberry-tracker -free-live-gps-tracking-anti-thefl-with-geofence-alerts- gps-history-for-blackberry/].
Aziz., "Facebook Friends GPS: Track and Locate Facebook Friends using Mobile GPS Co-ordinates," Nov. 2007, 3 pages [retrieved on Apr. 23, 2009]. Retrieved from the Internet:[URL:http:I/7 4.125. 95.132/search?q=cache:YMQyX61ocQAJ:thinkabdul.com/2007/11/ 04/facebook-friends- gps-track-locate-facebook-friends-using-mobile-gps-co- ordinates/+updale+location+on+facebook+using+gps&hl= en&slrip=1].
Blackberry Enterprise Server on Domino Discussion, "GPS Reporting to BES Server in 4.1 SP3 IT Policy," May 30, 2007, 3 pages [online] [retrieved on Feb. 1, 2009]. Retrieved from the Internet:[URL:http://besdomino.blogspol.com/2007/05/gps-reporting-to-bes-server-in-41-sp3.html].
Canadian Patent Application No. 2,701,230, Office Action dated Nov. 18, 2013.
Canadian Patent Application No. 2701998, Examiner's Report dated Aug. 18, 2016.
Canadian Patent Application No. 2,701,998, Office Action dated Aug. 20, 2013.
Canadian Patent Application No. 2,701,998, Office Action dated May 14, 2014.
Chinese Patent Application No. 201010214789.2, Office Action dated Aug. 3, 2016—Without English Translation.
Chinese Patent Application No. 201010214789.2, Office Action dated Mar. 21, 2016—Without English Translation.
Chinese Patent Application No. 201010214789.2, Office Action dated Oct. 23, 2012—English Translation available.
Chinese Patent Application No. 201010214789.2, Reexamination Office Action dated Aug. 21, 2015—English Translation Available.
Daft Logic, "Click for Country," Feb. 2009, 4 pages [online] [retrieved on Apr. 28, 2009]. Retrieved from the Internet: [URL: http://www.daftlogic.com/sandbox-click-for-country.htm].
Daft Logic., "Google Maps Reverse Geocoder," Feb. 21, 2008, 4 pages [online] [retrived on Apr. 28, 2009]. Retrieved from the Internet:[URL:http://www.daftlogic.com/sandbox-google-maps-reverse-geocoder.htm].
European Patent Application No. 09159118.0, Search and Exam Report dated Sep. 30, 2009.
European Patent Application No. 09159121.4, European Search Report dated Apr. 1, 2010.
European Patent Application No. 09159123.0, European Search Report dated Mar. 8, 2010.
European Patent Application No. 09159125, European Search Report dated Mar. 16, 2010.
European Patent Application No. 09159125.5, Communication pursuant to Article 94(3) EPC dated Mar. 19, 2019.
European Patent Application No. 09159125.5, Office Action dated Aug. 2, 2018.
European Patent Application No. 09159125.5, Office Action dated Dec. 20, 2016.
European Patent Application No. 10191092.5, Communication pursuant to Article 94(3) EPC dated Mar. 19, 2019.
European Patent Application No. 10191092.5, Extended European Search Report dated Feb. 2, 2011.
European Patent Application No. 10191092.5, Office Action dated Aug. 2, 2018.
European Patent Application No. 10191092.5, Office Action dated Dec. 20, 2016.
Google Mobile., "Google Latitude: Latitude for Your Phone," Feb. 5, 2009, 2 pages [online] [retrieved on Mar. 25, 2009]. Retrieved from the Internet:[URL:http://www.google.com/mobile/default/ latitude.html].
GPS World, "Loop! Location-Sharing Joins Google Android Market," Dec. 2008, 3 pages [online] [retrieved on Apr. 29, 2009]. Retrieved from the Internet:[URL: http://lbs.gpsworld.com/gpslbs/ LBS+News/Loopt-Location-Sharing-Joins-Google-Android-Market!ArticleStandard/Article/delail/571971?contextCategoryId= 38444&searchString=loopt].
Greenwell, "OMA and Location Based Services," OMA Mobile Alliance, London, Sep. 3-4, 2008, 26 pages in total.
Indian Patent Application No. 1191/CHE/2010, Office Action dated Jul. 21, 2016.
Ku et al., "Location-based Spatial Queries with Data Sharing in Mobile Environments," University of Southern California, [online], Apr. 3-7, 2006 22 pages. Retrieved from Internet:[URL:http:// citeseerx.istpsu.edu/viewdoc/summary?doi=10.1.1.99.43].
Leonhardi et al., "A Comparison of Protocols for Updating Location Information," University of Stuttart, [online], Mar. 7, 2000. Retrieved from the Internet:[URL:http://citeseencist.psu.edu/viewdoc/summary? doi=10.1.1.41.1826].
Marshall et al., "Siliconbeat: A Blog Tool to Fence in Your Children [online]," Feb. 2005, 2 pages [retrieved on Feb. 1, 2009]. Retrieved from the Internet:[URL: http://www.siliconbeal.com/entries/2005/ 02/08/a_blog_tool_to_fence_in_your_children.html].
MoosTrax., "MoosTrax GPS Tracking for Mobile Devices," Feb. 2009, 2 pages [online] [retrieved on Feb. 1, 2009]. Retrieved from the Internet:[URL: http://moostrax.com/feature/geofence/].
Muthukrishnan et al., "WLAN Location Sharing Through a Privacy Observant Architecture," Jan. 8-12, 2006, 2006 1st International Conference on Communication Systems Software & Middleware, New Delhi, pp. 1-10. [online] Retrieved from the Internet:[URL: http://citeseencist.psu/edu/viewdoc/summary?doi=10.1.1.99.7675].
MyRete Mobile Proximity Networking., "WhosHere," Apr. 2009, 3 pages [online] [retrieved on Apr. 28, 2009]. Retrieved from the Internet:[URL: http://myrete.com/WhosHere.html].
OMA Open Mobile Alliance., "Mobile Codes Requirements," Draft Version 1.0.0, Dec. 6, 2008, pp. 1-34.
Pitoura et al., "Locating Objects in Mobile Computing," IEEE Transactions on Knowledge and Data Engineering, Jul. 2001, vol. 13 (4), pp. 1-43.
Schilit et al., "Disseminating Active Map Information to Mobile Hosts," IEEE Networks, Sep. 1994, vol. 8 (5) pp. 1-23. Retrieved from the Internet:[URL: http://citeseerx.ist.psu_edu/viewdoc/summary? doi=10.1.1.49.1499].
Sprint Family Locator: Compatible Mobile Phones., "About Sprint Family Locator," Jun. 18, 2006, 1 page [online] [retrieved on Feb. 1, 2009]. Retrieved from the Internet:[URL:http://sftspintpcs.com/ finder-sprint-family/moreInfo.htm].
Trackr, "Trackr! GPS tracking," Aug. 16, 2007, 1 page [online] [retrieved on Feb. 1, 2009]. Retrieved from the Internet: [URL:http:www. trackr.eu/].
Trillium Software., "Global Locator for Geocoding," Feb. 2009, 1 page [online] [retrieved on Apr. 28, 2009]. Retrieved from the Internet:[URL:http://www.trilliumsoftware.com/home/products/ globallocator/index.aspx].
U.S. Appl. No. 15/707,363, First Non-Final Office Action dated Jun. 20, 2018.
U.S. Appl. No. 15/707,363, Second Final Office Action dated Nov. 19, 2018.

(56) References Cited

OTHER PUBLICATIONS

U.S. Appl. No. 12/432,226, Office Action dated Mar. 13, 2013.
U.S. Appl. No. 12/432,226, Office Action dated Nov. 22, 2011.
U.S. Appl. No. 12/432,226, Office Action dated Oct. 25, 2012.
U.S. Appl. No. 12/432,412, Non-Final Office Action dated Jul. 11, 2011.
U.S. Appl. No. 14/478,262, Office Action dated Nov. 26, 2014.
U.S. Appl. No. 14/711,512, Final Office Action dated Oct. 17, 2016.
U.S. Appl. No. 14/711,512, Non-Final Office Action dated Jan. 8, 2016.
U.S. Appl. No. 14/711,512, Non-Final Office Action dated May 17, 2016.
European Patent Application No. 20156619.7, Extended European Search Report dated Aug. 12, 2020.

\* cited by examiner

METHOD AND APPARATUS FOR LOCATION NOTIFICATION USING LOCATION CONTEXT INFORMATION

FIELD OF THE DISCLOSURE

The application relates to mobile devices, and more particularly to location notification.

BACKGROUND

A location-based service (LBS) is an information and entertainment service that makes use of the geographical position of one or more mobile devices. Some applications involve tracking the geographic location of one or more mobile devices. In order for a communication device to track the location of a mobile device, the communication device receives location information of the mobile device. The location information can be generated by the mobile device using GPS technology or by other means. The communication device can receive location information on an ongoing basis in order to keep up to date on the geographical location of the mobile device.

The location information of the mobile device might include latitude and longitude information representing the location of the mobile device. If the location of the mobile device is displayed on a map, then a user can typically understand the geographical location of the mobile device. However, without the location of the mobile device being displayed on a map, the latitude and longitude information by itself might not very helpful for the user.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to a broad aspect, there is provided a method comprising: determining a location of a mobile device; based on the location of the mobile device, automatically determining a point of interest in a vicinity of the mobile device; automatically generating location context information indicating the point of interest; and executing a location notification using the location context information.

According to another broad aspect, there is provided a computer readable medium having computer executable instructions stored thereon for execution on a processor of a mobile device or a server so as to implement the method as summarised above.

According to another broad aspect, there is provided a mobile device comprising: a wireless access radio; a processor; and a location context notifier configured for: determining a location of a mobile device; based on the location of the mobile device, automatically determining a point of interest in a vicinity of the mobile device; automatically generating location context information indicating the point of interest; and executing a location notification using the location context information.

According to another broad aspect, there is provided a server comprising: a processor; and a location context notifier configured for: determining a location of a mobile device; based on the location of the mobile device, automatically determining a point of interest in a vicinity of the mobile device; automatically generating location context information indicating the point of interest; and executing a location notification using the location context information.

Other aspects and features of the present disclosure will become apparent, to those ordinarily skilled in the art, upon review of the following description of the specific embodiments of the invention.

Systems for Location Notification

Figure 1:
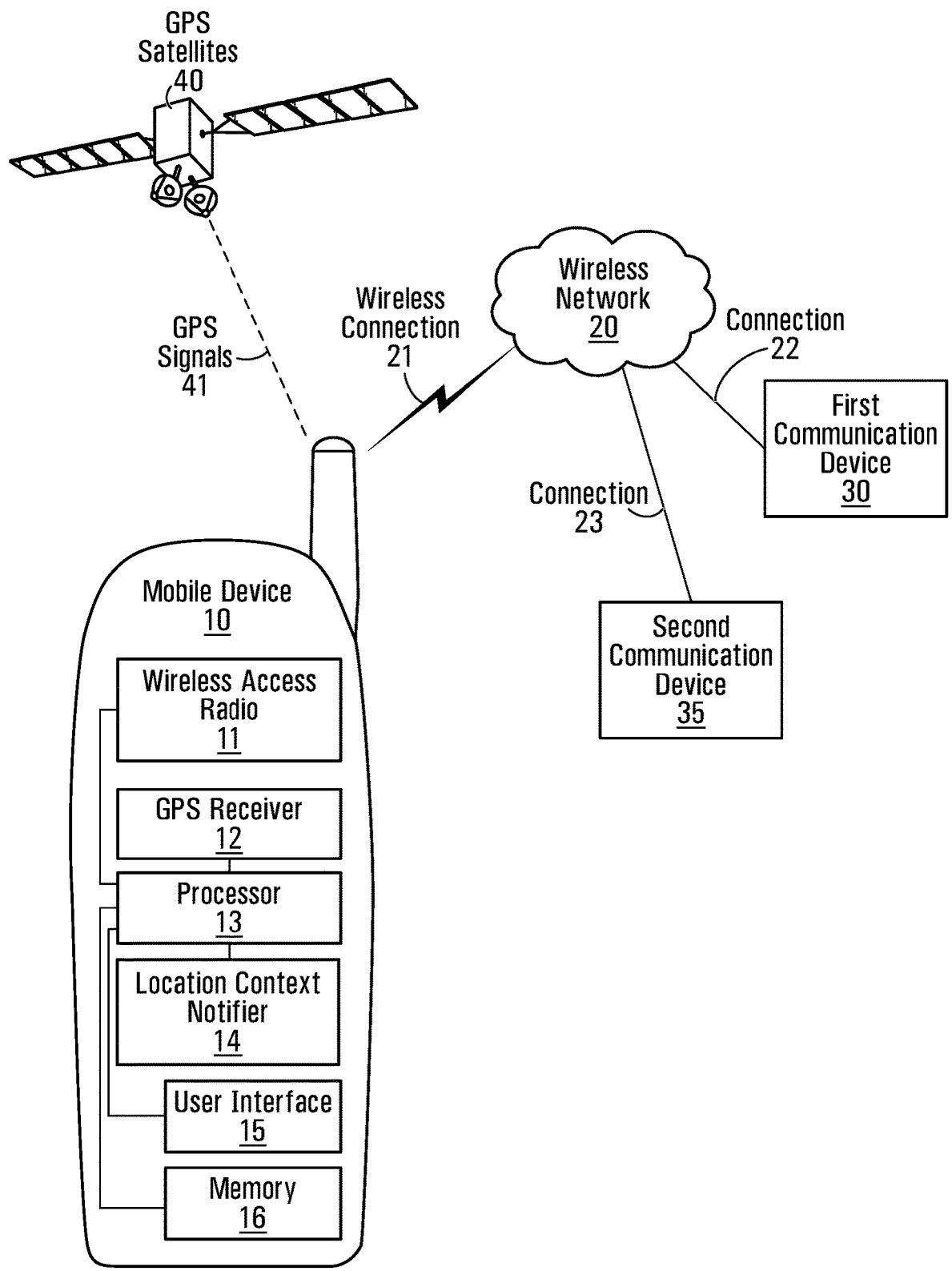
FIG. 1 is a block diagram of an example communication system featuring peer-to-peer communication.

Turning now to FIG. 1, shown is a block diagram of an example communication system featuring peer-to-peer communication. The communication system has a wireless network 20, and a plurality of devices 10,30,35 including a mobile device 10 and other communication devices 30,35. There might be other devices, but they are not shown for simplicity. The mobile device 10 has a wireless access radio 11, a GPS receiver 12, a processor 13, a location context notifier 14, a user interface 15, a memory 16, and might have other components but they are not shown for simplicity. Details of the other communication devices 30,35 are omitted for simplicity. There are a plurality of GPS satellites 40 (only one shown for simplicity) for those devices that are GPS-enabled, for example the mobile device 10.

The operation of the communication system will now be described by way of example. Communication between the devices 10,30,35 is through the wireless network 20. The mobile device 10 uses its wireless access radio 11 for communicating wirelessly over a wireless connection 21, while the other communication devices 30,35 communicate over respective connections 22,23. The connections 22,23 can be wireless or wired depending on whether the communication devices 30,35 are mobile. For this example, it is assumed that the communication between the devices 10,30, 35 is performed in a peer-to-peer manner. However, alternative implementations are possible. An example featuring communication in a server-based manner is described later with reference to FIG. 2.

The mobile device 10 generates location information using GPS technology, which involves receiving GPS signals 41 from the GPS satellites 40 using its GPS receiver 12. The location information might for example include latitude and longitude information representing the location of the mobile device 10. Unfortunately, if this information is not displayed visually on a map, then it might not be particularly useful because latitude and longitude information is not very intuitive for users.

In accordance with an embodiment of the disclosure, the location context notifier 14 implements a method for location notification in a manner that indicates a point of interest in a vicinity of the mobile device 10. For example, if the user of the mobile device 10 is at home, then the location context notifier 14 might generate location context information indicating that the user is at home instead of merely indicating latitude/longitude information corresponding to the location of the home. The location context notifier 14 displays the location context information using the user interface 15. This serves to inform the user of the mobile device 10 of its location in a manner that is meaningful without the need for a map. Alternatively, or additionally, the location context notifier 14 provides the location context information to another device, for example one of the other communication devices 30,35 shown in the illustrated example. This serves to inform other users of the location of the mobile device 10 in a manner that is meaningful without the need for a map. Any location tracking application can be updated including those used for social networking such as Facebook or Twitter.

In some implementations, the location context notifier 14 generates the location context information as a function of both location and movement of the mobile device. For example, if the user of the mobile device 10 is near a work office and is moving towards the work office, then the location context notifier 14 might generate location context information indicating that the user is arriving at the work office. An example method of generating location context information as a function of both location and movement of a mobile device is described below with reference to FIG. 4.

In some implementations, the location context notifier 14 selects one of a plurality of points of interest according to at least one criterion. In specific implementations, the location context notifier 14 selects a point of interest that is nearest to the mobile device 10. Other implementations are possible. An example method of selecting a point of interest is described below with reference to FIG. 5.

In some implementations, the points of interest include public points of interest. This would for example include public landmarks such as stores, buildings, movie theatres, etc. In some implementations, the public points of interest are stored in a communal database on a server (not shown). Thus, the mobile device 10 queries the database to determine a public point of interest in the vicinity of the mobile device 10. In alternative implementations, the public points of interest are stored in a local database stored on the mobile device 10, for example in the memory 16. In some implementations, at least some of the public points of interest are identified from mobile codes (e.g. bar codes or other visual/graphic representation of codes that may or may not contain "bars" such as Quick Response (QR) and Data Matrix codes). As a first example, a public point of interest might be encoded in a symbology (e.g. 'geo'URI, meeting point barcode, etc.) that can be scanned and decoded or otherwise obtained by the mobile device 10. Note that 'geo' URI is a location format under the GEOPRIV group in IETF and is currently an Internet Draft: http://tools.ietf.org/html/draft-mayrhofer-gropriv-geo-uri-01 the disclosure of which is incorporated herein by reference in its entirety. This URI could be included in the barcode. As another example, a public point of interest might be identified by receiving a business card identifying the point of interest using a bar code. Other implementations are possible.

In some implementations, the points of interest include at least one personal point of interest. Personal points of interest are user-specific. This would for example include the user's home, the user's work site, dwellings of friends/family of the user, etc. In some implementations, the personal points of interest are created by geocoding entries of an address book. In some implementations, besides the address book, favourite locations on a map application, pictures, or anything else with latitude and longitude information can be used. In some implementations, latitude and longitude information is obtained from a picture based on a meta tag encoded by a GPS-enabled camera that took the picture. The latitude and longitude information can for example be retrieved from metadata associated with the mobile code resolved content or included in the mobile code (e.g. JPEG2000, http://www.metadataworkinggroup.org/specs/ the disclosure of which is incorporated herein by reference in its entirety, DIG35, etc). In other implementations, latitude and longitude information is obtained from a picture based on the information being manually added or reversed geocoded if a user placed the picture on a map for example. More generally, any appropriate manner of obtaining the latitude and longitude information can be employed. In specific implementations, at least some of the personal points of interest are identified from mobile codes (e.g. bar codes or other visual/graphic representation of codes that may or may not contain "bars" such as Quick Response (QR) and Data Matrix codes). As a first example, a personal point of interest (e.g. 'geo' URI, meeting point barcode, etc.) might be encoded in a symbology that can be scanned and decoded or otherwise obtained by the mobile device 10. As another example, a personal point of interest might be identified by receiving a business card identifying the point of interest using a bar code. In some implementations, the personal points of interest include any combination of points of interest geocoded from an address book, points of interest from a map application, points of interest geocoded from pictures, and points of interest obtained from mobile codes.

In some implementations, the location context information is generated by the location context notifier 14 to additionally indicate the location of the mobile device 10 with varying degrees of accuracy by land/water, continent, country, time zone, state/province, city, city region, street address or intersection, etc. Any specific layer of map data can be tested for the additional information. This additional information can supplement the information indicating a point of interest in the vicinity of the mobile device 10. Other implementations are possible. In some implementations, the location context notifier 14 can be configured using the user interface 15 so as to define what is to be included with the location context information. The user interface 15 might for example be used to configure possible locations of interest and what, if any, additional location information is to be provided and to what degree of accuracy.

In some implementations, the location context notifier 14 generates the location context information from a mobile code at the time of resolution, that is, when the data within the mobile code is processed into resolved content. Resolved content can be retrieved directly from the mobile code as in the case of direct mode resolution, where the resolution is performed on the mobile device without any further processing. Alternatively, the decoded content might be a code identifier. A mobile device that reads (e.g. using a mobile code reader) such a mobile code may then send the code identifier to the network for resolution. As a response, the appropriate network entity returns the resolved content. In other implementations, the location context notifier 14 generates the location context information whenever there is an update or change in the points of interest. For example, if a point of interest is identified by scanning a point of interest encoded in a barcode, then the location context notifier 14 generates the location context information upon scanning the barcode. In other implementations, the location context notifier 14 generates the location context information upon request. Other implementations are possible.

In specific implementations, location context information is included in the data format encoded in a mobile code format (e.g. 'geo' URI, meeting point barcode, etc.). In direct mode, the mobile code contains all relevant information and no network information is needed. In indirect mode, the mobile code contains a content identifier or other pointer to a resource (e.g. on a server) from which relevant information is retrieved. In other specific implementations, the location context information generated by the location context notifier 14 adheres to a business card format. In some implementations, the location context notifier 14 supports the encoding of business cards in the Symbology. The Symbology is the algorithm by which data is encoded as visual elements (typically arrangements of lines or squares), and the resultant "look and feel" (e.g. 1-dimensional, 2-dimensional barcode, colored code, etc.) for the user. In some implementations, the business card format supports multiple character sets including numeric, alphanumeric, special character sets, 2 byte character sets (e.g., Asian languages), plain text, and international text. The business card format can be used to encode the location context information and might also encode other location information such as longitude and latitude information for example. In direct mode, the business card is encoded with all relevant information. In indirect mode, the business card is encoded with a hex ID or other pointer to a resource (e.g. on a server) from which relevant information can be retrieved.

In some implementations, when a device receives the location context information in business card format, the device is able to recognize and process the business card information. For example, if the first communication device 30 receives the location context information of the mobile device 10 in business card format, then the first communication device 30 recognizes and processes the location context information and any other information that might be encoded, for example name, addresses, company name, email addresses, phone numbers, birthday, Nickname and URLs. In some implementations, if the business card information is selected, then the first communication device 30 invokes an application to store the data in a phone book or address book. In some implementations, if the location data is selected, then the first communication device 30 invokes a location tracking application for example to display the location of the mobile device 50 on a map. Other implementations are possible.

In the illustrated example, it is assumed that the location context notifier 14 generates location context information for the mobile device 10. However, it is to be understood that additionally, or alternatively, the location context notifier 14 might generate location context information for another mobile device that provides its location information. For example, if the second communication device 35 is mobile and provides its location information to the mobile device 10, then the location context notifier 14 might generate location context information indicating a location of interest in a vicinity of the second communication device 35. The location context notifier 14 might for example display the location context information using the user interface 15.

The possible points of interest for the second communication device 35 can include public points of interest and/or personal point of interest as similarly described above for the mobile device 10. For personal points of interest such as those derived from an address book, the second communication device 35 might for example provide data such as its address book to the mobile device 10. This would allow the mobile device 10 to derive personal points of interest for the second communication device 35. In specific implementations, this is provided in a business card format, as similarly described above. Other implementations are possible.

In the illustrated example, the location context notifier 14 is implemented as software and is executed on the processor 13. However, more generally, the location context notifier 14 may be implemented as software, hardware, firmware, or any appropriate combination thereof.

It is to be understood that embodiments of the disclosure are similarly applicable to server-based communication between the devices 10,30,35. For server-based implementations, the mobile device can perform the location notification using location context information as similarly described above. The server might for example operate as a conduit for the location context information. Alternatively, the server itself can perform the location notification using location context information. An example of this is described below with reference to FIG. 2.

Figure 2:
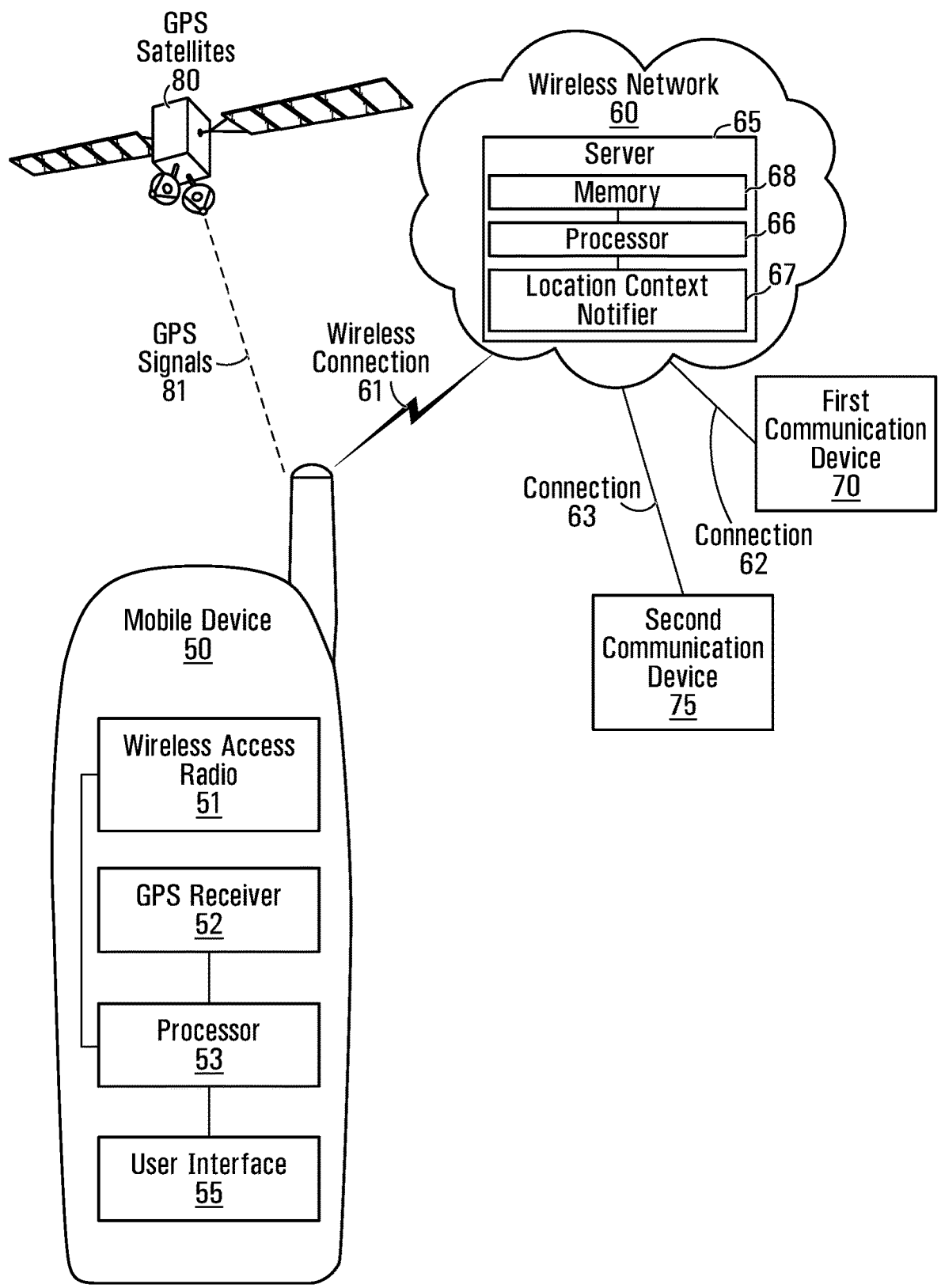
FIG. 2 is a block diagram of an example communication system featuring server-based communication.

Turning now to FIG. 2, shown is a block diagram of an example communication system featuring server-based communication. The communication system has a wireless network 60, and a plurality of devices 50,70,75 including a mobile device 50 and other communication devices 70,75. There might be other devices, but they are not shown for simplicity. The mobile device 50 has a wireless access radio 51, a GPS receiver 52, a processor 53, a user interface 55, and might have other components but they are not shown for simplicity. Details of the other communication devices 70,75 are omitted for simplicity. The wireless network 60 has a server 65, which has a processor 66, a location context notifier 67, a memory 68, and might have other components but they are not shown for simplicity. The server 65 is shown as part of the wireless network 60. In alternative configurations, the server 65 does not form part of the wireless network 60 and is instead coupled to the wireless network 60. There are a plurality of GPS satellites 80 (only one shown for simplicity) for those devices that are GPS-enabled, for example the mobile device 50.

The operation of the communication system will now be described by way of example. For this example, it is assumed that the first communication device 70 is to receive location updates of the mobile device 50. Communication between the devices 50,70,75 is through the server 65 of the wireless network 60. The mobile device 50 uses its wireless access radio 51 for communicating wirelessly over a wireless connection 61, while the other communication devices 70,75 communicate over respective connections 62,63. The connections 62,63 can be wireless or wired depending on whether the communication devices 70,75 are mobile. Communication between the devices 50,70,75 is performed in a server-based manner.

The mobile device 50 generates location information using GPS technology, which involves receiving GPS signals 81 from the GPS satellites 80 using its GPS receiver 52. The mobile device 50 provides the location information to the server 65. If a recipient of this information does not display this information visually on a map, then it might not be particularly useful to the recipient because latitude and longitude information is not very intuitive. Thus, if the server 65 were to merely forward this information to the first communication device 70, then the location information might be difficult to understand by the user of the first communication device 70, unless perhaps if the location information is displayed on a map.

In accordance with an embodiment of the disclosure, the location context notifier 67 implements a method for location notification in a manner that indicates a point of interest in a vicinity of the mobile device 50. For example, if the user of the mobile device 50 is at home, then the location context notifier 67 might generate location context information indicating that the user is at home instead of merely indicating latitude/longitude information corresponding to the location of the home. The location context notifier 67 executes the location notification by providing the location context information to at least one other device, including the first communication device 70 in this particular example. The location context notifier 67 might also provide the location context information to the mobile device 50.

In some implementations, the location context notifier 67 can be configured by a remote user, for example by the user of the mobile device 50 using the user interface 55. Various settings might be configurable by the user, as similarly described for the example provided above with reference to FIG. 1. The points of interest and/or settings configurable by the user can be stored on the server 65, for example in the memory 68.

In specific implementations, the location context information generated by the location context notifier 67 adheres to a business card format, as similarly described above with reference to FIG. 1. In some implementations, when a device receives the location context information in business card format, the device is able to recognize and process the business card information, as similarly described above with reference to FIG. 1. If the business card is encoded in the indirect mode, then the hex ID or other pointer might for example refer to a resource on the server 65, for example in the memory 68. Relevant information can be retrieved from the resource using the hex ID or other pointer.

In the illustrated example, the location context notifier 67 of the server 65 is implemented as software and is executed on the processor 66. However, more generally, the location context notifier 67 may be implemented as software, hardware, firmware, or any appropriate combination thereof. In some implementations, the server 65 is a presence server.

In the illustrated examples present above with reference to FIG. 1 and FIG. 2, details of the wireless networks 20,60 have been omitted. It is to be understood that the wireless networks 20,60 would have any appropriate combination of components suitable for a wireless network. Note that the wireless networks 20,60 may include wires in spite of having components for wireless communication. The components of the wireless networks 20,60 are implementation specific and may depend on the type of wireless network. Any appropriately configured wireless network can be used. In specific implementations, the wireless networks 20,60 are GSM (Global System for Mobile communications)/EDGE (Enhanced Data rates for GSM Evolution)/3G or CDMA (Code Division Multiple Access) networks. In other implementations, the wireless networks 20,60 are WiFi networks. Other implementations are possible.

In the illustrated examples present above with reference to FIG. 1 and FIG. 2, it is assumed that at least some of the devices are GPS-enabled for determining geographic location. Whilst examples presented herein focus on use of GPS, it is to be understood that alternative means for determining geographic location are possible and are within the scope of this disclosure. For example, geographic location can alternatively be determined based on cell/sector identification within cellular network. As another example, geographic location can be determined using triangulation of signals from in-range base towers, such as those used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Coarser location information can be obtained not only be triangulating the device's position based on nearby cell towers but also based on nearby Wi-Fi access points via a WLAN radio. As an alternative example, geographic location can be determined based on mobile codes (e.g. bar codes or other visual/graphic representation of codes that may or may not contain "bars" such as Quick Response (QR) and Data Matrix codes). Each mobile code is located in a predefined location and encodes location information for that location. A mobile device, upon scanning/taking picture of one of these mobile codes, can obtain the location information. The mobile codes can be 1-dimensional, 2-dimensional, or other. Other means for determining geographic location may be possible.

Further details of executing a location notification in a manner that indicates a point of interest in a vicinity of a mobile device are provided below with reference to FIG. 3 through FIG. 5.

Methods for Location Notification

Figure 3:
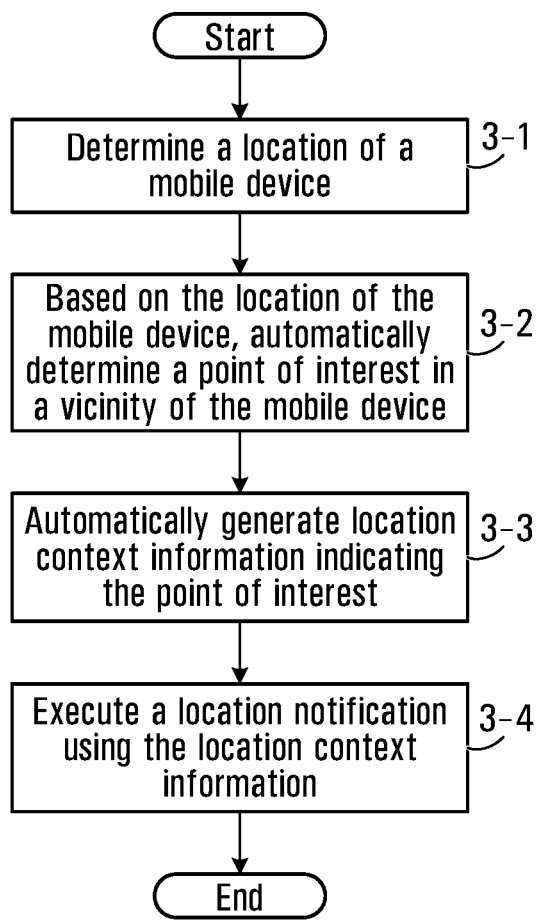
FIG. 3 is a flowchart of a method of location notification using location context information.

Referring now to FIG. 3, shown is a flowchart of a method of location notification using location context information. This method may be implemented in a mobile device, for example by the location context notifier 14 of the mobile device 10 shown in FIG. 1. Alternatively, this method may be implemented in a server, for example by the location context notifier 67 of the server 65 shown in FIG. 2. More generally, this method may be implemented in any appropriately configured apparatus.

At step 3-1, the apparatus determines a location of a mobile device. At step 3-2, based on the location of the mobile device, the apparatus automatically determines a point of interest in a vicinity of the mobile device. Examples of how the apparatus might select one of a plurality of points of interest have been provided above. At step 3-3, the apparatus automatically generates location context information indicating the point of interest. At step 3-4, the apparatus executes a location notification using the location context information. In this manner, the location notification is executed in a manner that indicates the point of interest in the vicinity of the mobile device.

If the apparatus executing the method is the mobile device itself, then the location notification might for example include displaying the location context information. This serves to inform the user of the mobile device of its location in a manner that is meaningful without the need for a map. Alternatively, or additionally, the location notification involves providing the location context information to another device. This serves to inform other users of the location of the mobile device in a manner that is meaningful without the need for a map.

Figure 4:
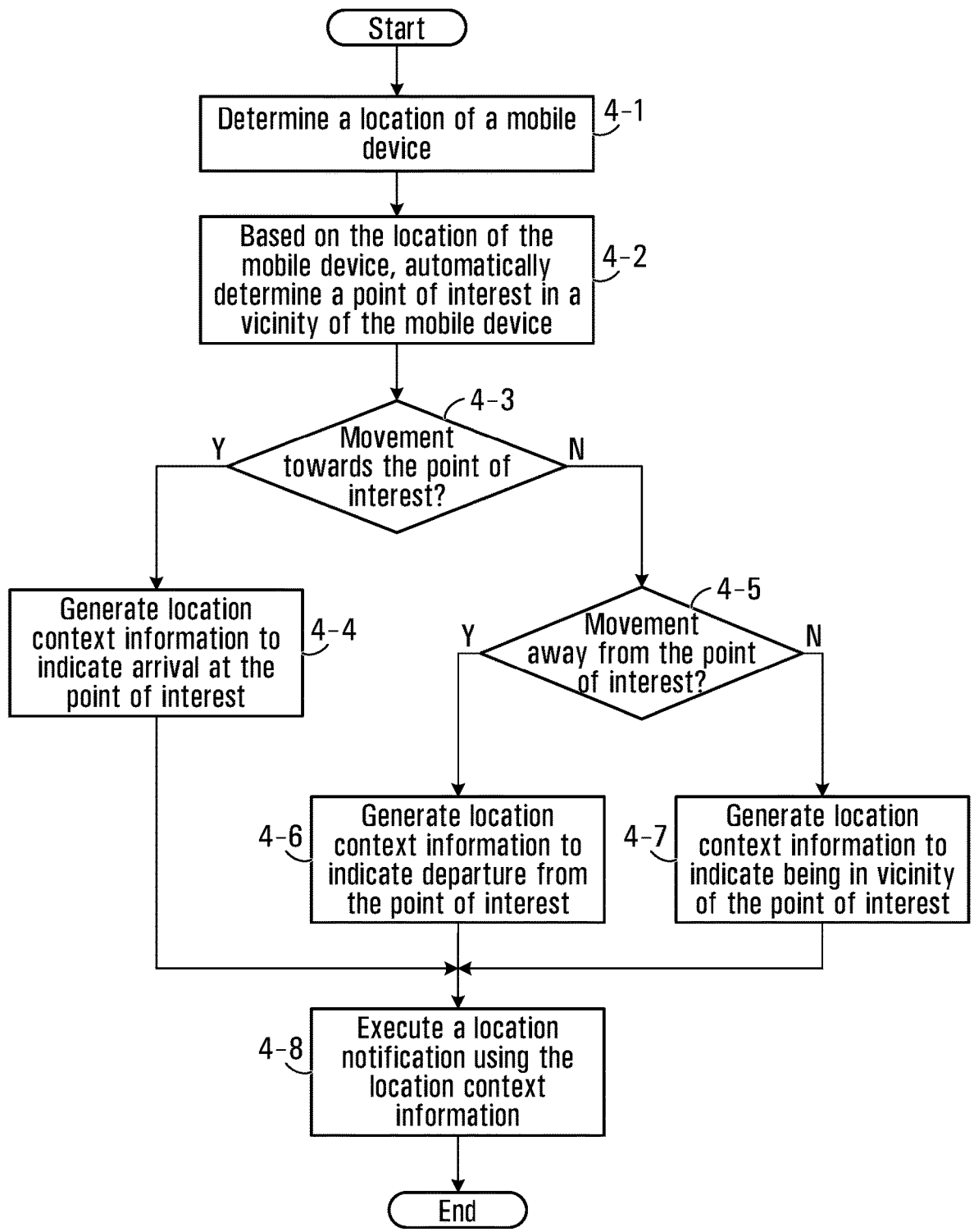
FIG. 4 is a flowchart of another method of location notification using location context information.

Referring now to FIG. 4, shown is a flowchart of another method of location notification using location context information. This method may be implemented in a mobile device, for example by the location context notifier 14 of the mobile device 10 shown in FIG. 1. Alternatively, this method may be implemented in a server, for example by the location context notifier 67 of the server 65 shown in FIG. 2. More generally, this method may be implemented in any appropriately configured apparatus.

At step 4-1, the apparatus determines a location of a mobile device. At step 4-2, based on the location of the mobile device, the apparatus automatically determines a point of interest in a vicinity of the mobile device. At step 4-3, the apparatus determines whether there is movement towards the point of interest. If there is movement towards the point of interest, then at step 4-4, the apparatus generates location context information to indicate arrival at the point of interest. However, if there is no movement towards the point of interest and instead the apparatus determines at step 4-5 that there is movement away from the point of interest, then at step 4-6 the apparatus generates location context information to indicate departure from the point of interest. If there is no movement towards or away from the point of interest, then at step 4-7 the apparatus generates location context information to indicate being in vicinity of the point of interest. Once location context information is generated (either at step 4-4, 4-6, or 4-7), then at step 4-8 the apparatus executes a location notification using the location context information. In this manner, the location notification is executed in a manner that indicates the point of interest in the vicinity of the mobile device.

If the apparatus executing the method is the mobile device itself, then the location notification might for example include displaying the location context information. This serves to inform the user of the mobile device of its location in a manner that is meaningful without the need for a map. Alternatively, or additionally, the location notification involves providing the location context information to another device. This serves to inform other users of the location of the mobile device in a manner that is meaningful without the need for a map.

In some implementations, the location context information is generated whenever the mobile device becomes within or falls out of from the vicinity of the location of interest. In some implementations, location notifications are triggered by changes to the location context information. Thus, changes to the location of the mobile device can be timely reflected in the location notifications. In some implementations, the update is dependent on the location context information. For example, if the user has moved a large distance since the last update then chances are they were on a plane and the notification could use a city or country information as opposed to a street: "User is in Amsterdam", "User is in France" as opposed to providing the street location. The context could also be specified by the application. For example, the application could state that it wants notification only at the city level (i.e. only provide updates when the user changes cities.)

Figure 5:
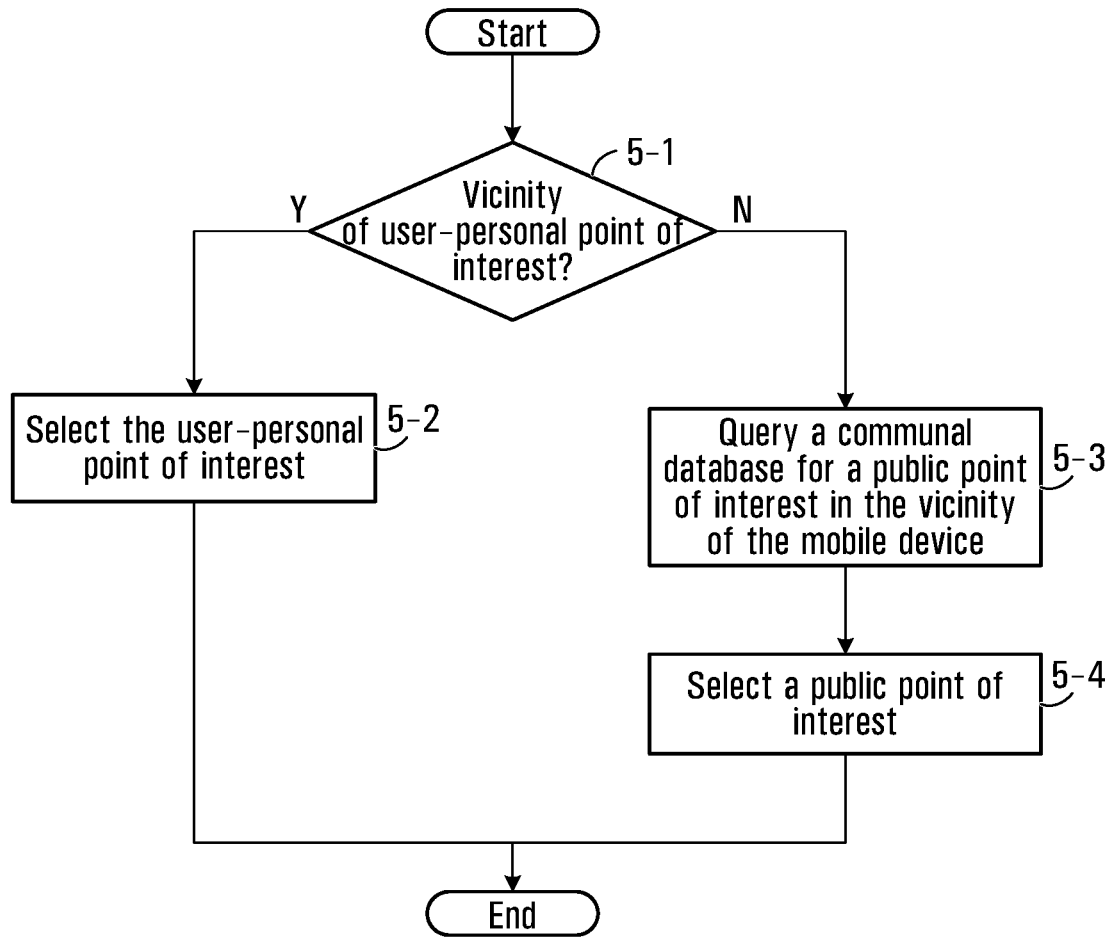
FIG. 5 is a flowchart of a method of selecting a point of interest for location context information.

Referring now to FIG. 5, shown is a flowchart of a method of selecting a point of interest for location context information. This method may be implemented in a mobile device, for example by the location context notifier 14 of the mobile device 10 shown in FIG. 1. Alternatively, this method may be implemented in a server, for example by the location context notifier 67 of the server 65 shown in FIG. 2. More generally, this method may be implemented in any appropriately configured apparatus.

At step 5-1, the apparatus determines whether a mobile device is in a vicinity of user-personal point of interest. Examples of user-personal points of interest have been described above. If the mobile device is in the vicinity of user-personal point of interest, then at step 5-2 the apparatus selects the user-personal point of interest. Note that this is performed without any consideration of public points of interest. This is an example of a bias towards user-personal point of interest. However, if there are no user-personal points of interest in the vicinity of the mobile device, then at step 5-3 the apparatus queries a communal database for a public point of interest in the vicinity of the mobile device. At step 5-4, the apparatus selects a public point of interest.

It is to be understood that the method described with reference to FIG. 5 is one of many different ways for selecting a point of interest for location context information. In some implementations, the apparatus selects a point of interest that is nearest to the mobile device. In other implementations, the apparatus selects a point of interest to which the mobile device is moving towards. Note that this might not be the location of interest that is nearest to the mobile device. In other implementations, the apparatus selects a point of interest with a bias towards certain locations of interest. Other implementations are possible. More generally, a point of interest is selected based on at least one criterion.

Another Mobile Device

Figure 6:
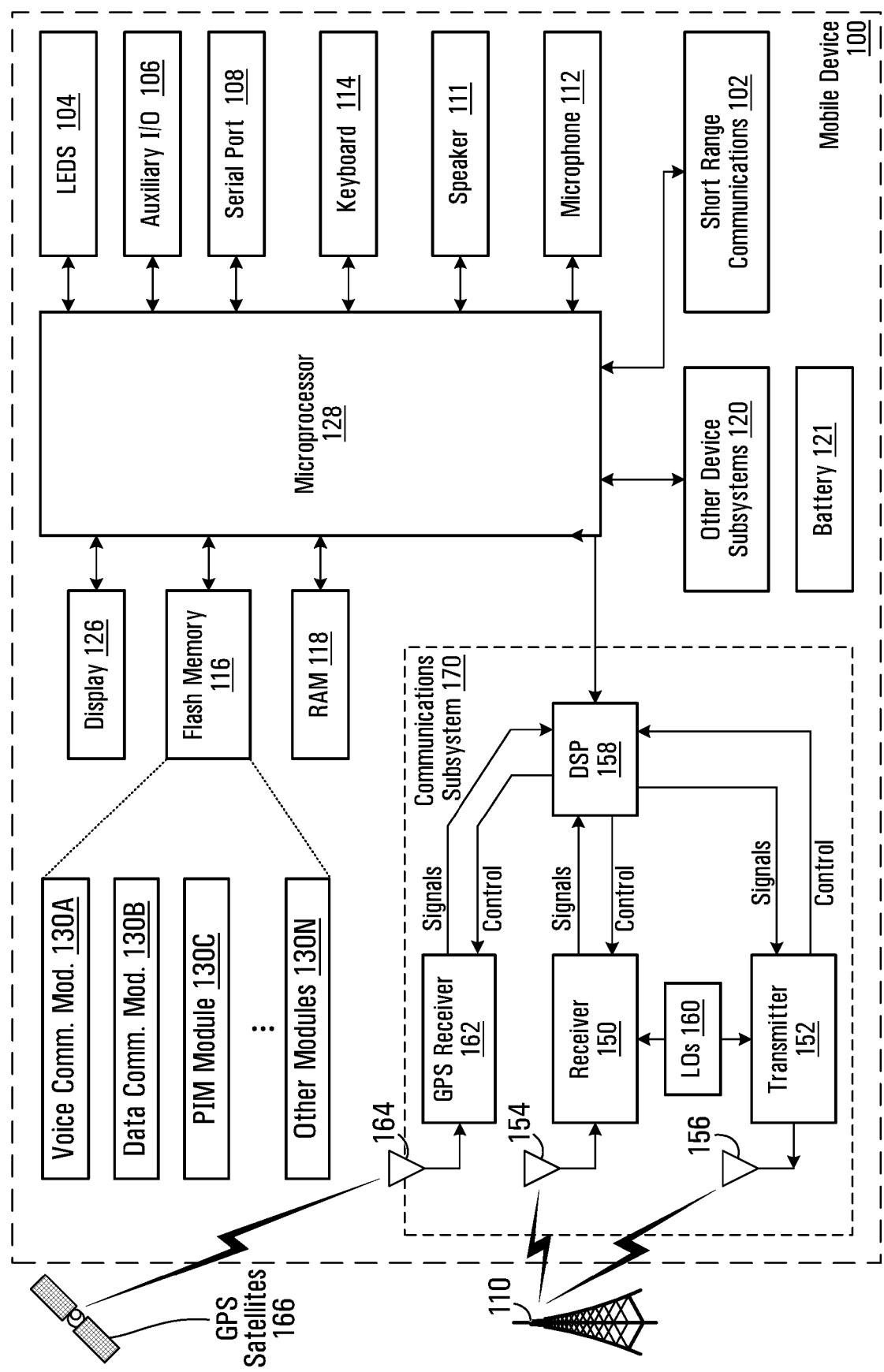
FIG. 6 is a block diagram of a mobile device.

Referring now to FIG. 6, shown is a block diagram of another mobile device 100 that may implement any of the device methods described herein. The mobile device 100 is shown with specific components for implementing features similar to those of the mobile device 10 shown in FIG. 1. It is to be understood that the mobile device 100 is shown with very specific details for exemplary purposes only.

A processing device (a microprocessor 128) is shown schematically as coupled between a keyboard 114 and a display 126. The microprocessor 128 is a type of processor with features similar to those of the processor 13 of the mobile device 10 shown in FIG. 1. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the location context notifier 14 of the mobile device 10 shown in FIG. 1. In a specific implementation, the other module 130N of the flash memory 116 stores computer executable instructions that when executed implement a location context notifier. Note that the implementations described with reference to FIG. 6 are very specific for exemplary purposes.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154 and a transmit antenna 156, and a GPS antenna 164. In addition, the communication subsystem 170 also includes a processing module, such as a digital signal processor (DSP) 158, and local oscillators (LOs) 160. The communication subsystem 170 having the transmitter 152 and the receiver 150 is a wireless access radio with features similar to those of the wireless access radio 11 of the mobile device 10 shown in FIG. 1. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1x and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

We claim:

1. A method comprising:
   determining a current location of a mobile device;
   determining a point of interest in a vicinity of the current location of the mobile device, wherein the determining comprises querying a communal database for a plurality of public points of interest in the vicinity of the current location of the mobile device and automatically selecting one of the plurality of public points of interest according to at least one criterion such that the selected point of interest conveys the current location of the mobile device; and
   transmitting a location context notification that indicates the selected point of interest in order to convey the current location of the mobile device and transmitting information for the selected point of interest in the vicinity of the current location of the mobile device, wherein the location context notification is not displayed on a map.

2. The method of claim 1, further comprising generating the location context notification indicating the point of interest based on both the current location and movement of the mobile device.

3. The method of claim 2, wherein generating the location context notification based on both the current location and movement of the mobile device comprises:
   determining whether the mobile device is moving towards the point of interest; and
   if the mobile device is moving towards the point of interest, generating the location context notification to indicate arrival at the point of interest.

4. The method of claim 2, wherein generating the location context notification based on both the current location and movement of the mobile device comprises:
   determining whether the mobile device is moving away from the point of interest; and
   if the mobile device is moving away from the point of interest, generating the location context notification to indicate departure from the point of interest.

5. The method of claim 1, wherein selecting one of a plurality of points of interest according to at least one criterion comprises:
   selecting one of the plurality of points of interest that is nearest to the current location of the mobile device.

6. The method of claim 1, wherein the location context notification indicating the current location of the mobile device is a text based notification.

7. The method of claim 1, wherein determining the current location of the mobile device comprises at least one of:
   determining the current location of the mobile device based on location information retrieved from a mobile code; or determining the current location of the mobile device based on GPS (Global Positioning System).

8. The method of claim 1, wherein:
   the method is executed in the mobile device; and
   transmitting the location context notification that indicates the selected point of interest comprises at least one of:
   the mobile device displaying the selected point of interest; or the mobile device providing the selected point of interest to a server or to at least one other device.

9. The method of claim 1, wherein:
   the method is executed in a server; and
   transmitting the location context notification that indicates the selected point of interest comprises:
   the server transmitting the selected point of interest to at least one of the mobile device or another device.

10. The method of claim 1, wherein the communal database of public points of interest comprises a database of public landmarks including buildings and businesses.

11. The method of claim 1, wherein the communal database of public points of interest is located at a server.

12. A mobile device comprising:
    a wireless access radio;
    a processor; and
    a location context notifier configured to:
    determine a current location of the mobile device;
    determine a point of interest in a vicinity of the current location of the mobile device, wherein the location context notifier being configured to determine a point of interest comprises the location context notifier being configured to query a communal database for a plurality of public points of interest in the vicinity of the current location of the mobile device and automatically select one of the plurality of public points of interest according to at least one criterion; and
    transmit a location context notification that indicates the selected point of interest in order to convey the current location of the mobile device and transmit information for the selected point of interest in the vicinity of the current location of the mobile device, wherein the location context notification is not displayed on a map.

13. The mobile device of claim 12, wherein the location context notifier is further configured to generate the location context notification indicating the point of interest by:
    generating the location context notification based on both the current location and movement of the mobile device.

14. The mobile device of claim 13, wherein the location context notifier is configured to generate the location context notification based on both the current location and movement of the mobile device by the location context notifier being configured to:
    determine whether the mobile device is moving towards the point of interest; and
    if the mobile device is moving towards the point of interest, generate the location context information to indicate arrival at the point of interest.

15. The mobile device of claim 13, wherein the location context notifier is configured to generate the location context notification based on both the current location and movement of the mobile device by the location context notifier being configured to:
    determine whether the mobile device is moving away from the point of interest; and
    if the mobile device is moving away from the point of interest, generate the location context notification to indicate departure from the point of interest.

16. The mobile device of claim 12, wherein the location context notifier is configured to select one of a plurality of points of interest according to at least one criterion by the location context notifier being configured to:
    select one of the plurality of points of interest that is nearest to the current location of the mobile device.

17. The mobile device of claim 12, wherein the location context notification indicating the current location of the mobile device is a text based notification.

18. The mobile device of claim 12, wherein the location context notifier is configured to determine the current location of the mobile device by the location context notifier being configured to determine the current location of the mobile device based on at least one of:
  location information retrieved from a mobile code; or
  GPS (Global Positioning System).

19. The mobile device of claim 12, wherein the communal database of public points of interest comprises a database of public landmarks including buildings and businesses.

20. The mobile device of claim 12, wherein the communal database of public points of interest is located at a server.

21. A server comprising:
  a processor; and
  a location context notifier configured to:
    determine a current location of a mobile device;
    determine a point of interest in a vicinity of the current location of the mobile device, wherein the location context notifier being configured to determine a point of interest comprises the location context notifier being configured to query a communal database for a plurality of public points of interest in the vicinity of the current location of the mobile device and automatically select one of the plurality of public points of interest according to at least one criterion; and
    transmit a location context notification to that indicates the selected point of interest in order to convey the current location of the mobile device and transmit information for the selected point of interest in the vicinity of the current location of the mobile device, wherein the location context notification is not displayed on a map.

22. A non-transitory computer-readable medium having stored thereon computer readable code executable by a processor to cause the processor to:
  determine a current location of a mobile device;
  query a communal database for a plurality of public points of interest in the vicinity of the current location of the mobile device and automatically select one of the plurality of public points of interest according to at least one criterion to determine a point of interest in a vicinity of the current location of the mobile device; and
  transmit a location context notification that indicates the selected point of interest in order to convey the current location of the mobile device and transmit information for the selected point of interest in the vicinity of the current location of the mobile device, wherein the location context notification is not displayed on a map.

* * * * *